Nov. 12, 1968    S. D. DE LAJARTE    3,410,672
GLASS WORKING APPARATUS WITH LIQUID SEAL
Filed Jan. 10, 1964    2 Sheets-Sheet 1
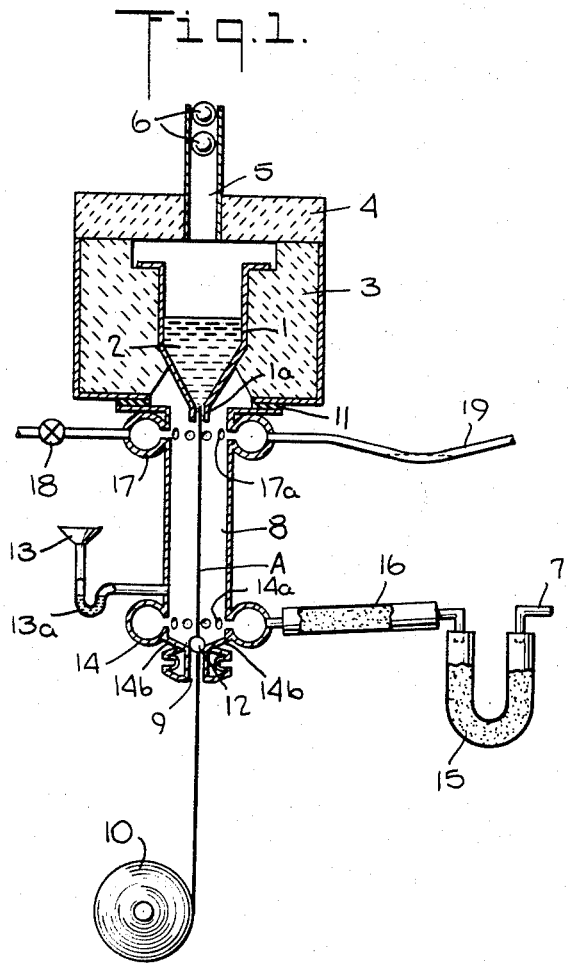
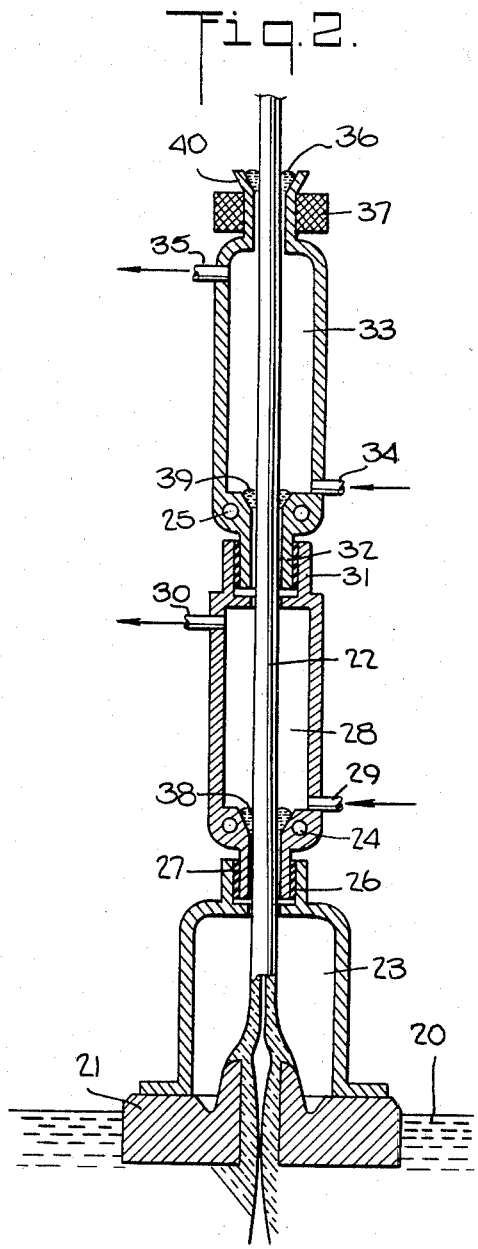
INVENTOR.
STÉPHANE DUFAURE DE LAJARTE
BY
Bauer & Seymour
ATTORNEYS United States Patent Office  3,410,672
Patented Nov. 12, 1968

3,410,672
GLASS WORKING APPARATUS WITH
LIQUID SEAL
Stephane Dufaure de Lajarte, Paris, France, assignor to
Compagnie de Saint-Gobain, Neuilly-sur-Seine, France
Filed Jan. 10, 1964, Ser. No. 337,066
Claims priority, application France, Jan. 12, 1963,
921,231
12 Claims. (Cl. 65—3)

This invention relates to the manufacture of articles in continuous lengths and to the treatment of all the length. The method and apparatus are particularly adapted to the manufacture of glass and the invention will be described in that application, it being understood that the description is exemplary.

Much of the manufacture of glass is done by continuous processes, for instance the manufacture of fibers and filaments, of tubes, and of flat glass and it may be useful to maintain locally in a determined atmosphere a part of the article in course of production. In these continuous processes the molten glass is shaped by appropriate means at an appropriate temperature and the shaped body progresses through cooling lehrs and through treating steps until it is brought to room temperature and wound on bobbins or cut into lengths.

It is advisable, whenever possible, to subject the glass to treatment before it is cut and accordingly the glass is passed progressively, when possible, from one treating step to another. For example, it may be useful to maintain at one location along the path of the glass a particular atmosphere or temperature whereby to act upon the surface of the glass. This localization of special conditions is difficult to achieve, particularly when the glass is still plastic, because the contact of the glass with closure means is apt to result in damage to it. For this reason the continuous process of treating glass has frequently omitted tight joints, and this has resulted in only the coarsest separation of treatments. Thus there may be uncontrolled mingling of fluids at different temperature and substantial losses which harmfully affect the cost of the process. Conditions become especially critical when it is desirable to treat the glass successively with different fluids, gaseous or liquid, which ought not to be mingled, and have produced undesirable complexity in the machinery employed.

It is an object of the invention to subject glass and other materials to progressive treatment by a series of fluids in separate chambers and to pass the glass from chamber to chamber through a liquid seal. Another object of the invention is to construct apparatus for handling continuous lengths of materials progressively in various states of concretion and to subject it to different conditions without bringing the material into contact with a solid object. Another object of the invention is to form a liquid seal for a chamber through which a length of solid material may be passed without breaking the seal. Another object is to treat a moving length of glass progressively and successively with different fluids, while maintaining the glass out of contact with solids and the treating fluids out of contact with each other. Other objects of the invention will be apparent from the specification and the claims which follow.

The objects of the invention are accomplished, generally speaking, by apparatus for the treatment of a continuous length of glass comprising a chamber having a shaped aperture for the passage of the glass closed by means of a liquid maintained by capillarity on said aperture provided in the solid material constituting the chamber; said material must not be wetted by the liquid; and by a method of treating lengths of materials progressively with a fluid which comprises providing a chamber for the treating fluid, which has apertures of admission and removal for the material, sealing the apertures with a non-adherent liquid, and moving the material progressively through the non-adherent liquid into contact with the treating fluid and out of the treating fluid and the chamber through the liquid seal.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a diagrammatic view in vertical section through novel apparatus for the manufacturing of glass fiber;

FIG. 2 is a vertical sectional view of apparatus for drawing glass tubing; and

Example I

Figure 3:
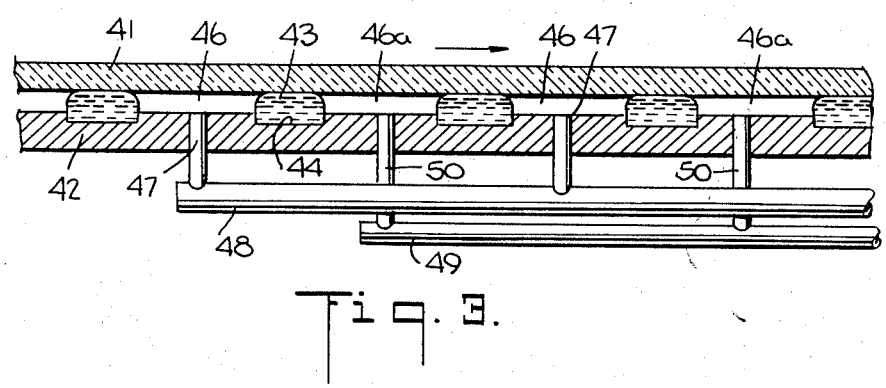
FIGS. 3 and 4 are views in vertical section of apparatus for supporting and treating the surface of moving flat glass progressively with a series of different fluids out of contact with solids.

This relates to the manufacture of glass fibers by drawing a filament continuously through a spinneret. Such fibers, as they issue from the spinneret, absorb the water vapor contained in the atmosphere, which is apt to form oxyhydrile radicals on the surface, which is undesirable for certain applications. According to the invention the glass is protected as it issues from the spinneret by enclosing it within a chamber in which an inert atmosphere is maintained. Apparatus for accomplishing this is shown in FIG. 1, in which the spinneret 1a is supplied by a platinum crucible 1, which comprises a plurality of openings 1a for the drawing of continuous fibers and contains molten glass 2 at the proper temperature for drawing, said crucible is encircled by a furnace 3 of refractory material which includes a cover 4 having an aperture 5 through which balls of glass 6 may be admitted. Beneath the furnace, surrounding the spinneret, is a chamber 8 which is sealed at its upper part by sealing means 11 and comprises at the bottom a slot 9 for the passage of the fibers. The fiber A which issues from the spinneret passes through the chamber and the slot 9 to a bobbin 10, upon which it is wound. The tightness along slot 9 is obtained according to the invention by a liquid joint which may be constituted by mercury 12 maintained by capillarity because of the narrowness of the slot. In ordinary practice the furnace will be elongated and will supply many spinnerets within the chamber 8. The chamber is closed at the bottom by angularly disposed plates 14b at the node of which are conical apertures immediately below the spinnerets 1a. Mercury fills these apertures, and the thread passes through the mercury without touching the wall of the aperture. The mercury is non-adherent and does not wet the wall of the aperture or the thread of glass. The space between the thread and the wall of the aperture is such that the mercury is retained in the gap by capillarity; it may be of about 1 mm. but is preferably from one to two tenths of a mm. In practice this liquid joint is easily maintained by providing a funnel 13 which is connected to the chamber by an inverted siphon 13a; if mercury is to be added, it is poured into the funnel and when the addition has been completed the mercury which remains in the siphon seals the chamber. If there is too much mercury in the bottom of the chamber, it will run out through the apertures, the necessary amount remaining ultimately suspended by capillarity in the apertures. The sealed chamber 8 has an inlet and a discharge port for air free of water vapor. In practice the air flows through a tube 7 to driers 15 and 16 which contain desiccants such as phosphoric anhydride or sulfuric acid. The dry air is admitted to the bottom of the chamber through orifices 14a, which lead to tuyeres 14 which are connected to drier 16. At the upper part of the chamber other tuyeres 17 are connected on one side to valve 18 and on the other to a manometer 19 which is marked to indicate the limits of pressure which are tolerable to the liquid seals. The tuyeres are connected by holes 17a to the inside of the chamber.

It is necessary to keep the gas pressure inside the chamber 8 low enough so that it will not blow the mercury out of the hydraulic joint 12, but not so low that the exterior pressure will blow it inward. It will be understood that the concentration of the gases and their rate of flow can be adjusted at will so long as the pressure is controlled.

The maintenance of the dry air around the newly formed glass thread has been described in this example but it should be understood that any other gas or liquid can be used the presence of which is not harmful to the fibers or reactive with the seals.

The treatment may be applied to all glasses capable of being drawn into fibers, for example a glass for the drawing of textile fibers or of fibers or the reinforcement of organic resins having the following composition:

| | Percent |
|---|---|
| $SiO_2$ | 53.7 |
| $B_2O_3$ | 10 |
| $Al_2O_3$ | 14 |
| CaO | 17 |
| MgO | 4 |
| $Na_2O$ | 0.2 |
| $K_2O$ | 0.4 |
| Fluorine | 1.2 |
| Oxygen corresponding to fluorine | 0.5 |

The fibers are drawn rom the molten glass at a temperature of 1200° C. It is not necessary to heat the chamber 8. It is sufficient to introduce in the chamber a gas previously dehydrated, said gas may be, preferably, air or an inert gas such as nitrogen or argon. In the present particular case the creation of an aerosol is not necessary.

The drawing of a fiber according to the invention increased its mechanical strength about 20%.

It is possible to draw a plurality of fibers through the slot 9, e.g. a few hundreds, corresponding to the number of fibers produced by the drawing of textile glass.

Example II

This example relates to the extrusion of a glass tube which is drawn vertically out of a bath of molten glass and upon the surface of which there are deposited two successive layers of a coating, the first a layer of tin oxide and the second layer of chromium oxide. The deposition of these layers provides the tube with an electrically conductive coat. The method provides an easy way of applying such coats in whatever thickness has the desired degree of conductivity or resistivity.

The glass is an ordinary sodo-calcique glass having, for example, the following composition:

| | Percent |
|---|---|
| $SiO_2$ | 71 |
| $Al_2O_3$ | 1 |
| $Na_2O$ | 16 |
| CaO | 9 |
| MgO | 3 | obtained from conventional batch materials.

The tube 22 is drawn from a bath of molten glass 20 through a draw bar 21 in a known manner and passes upward through chamber 23, chamber 28 and chamber 33. The chambers 23 and 28 have interfitting necks 26, 27 which are sealed. The chambers 28 and 33 have interfitting necks 31, 32 which are sealed. These necks are internally provided with an interconnecting aperture slightly larger than the size of the tube being drawn. The upper ends of the apertures are funnel shaped and receive a quantity of liquid metal 38, 39. The upper end of chamber 33 is provided with a neck 40 which is slightly larger than the tube and which also received a supply of liquid metal 36. In this case, the mercury can conveniently be replaced by molten tin which is maintained in a molten state by heating means 24, 25 and 37. The gap between the walls of the apertures and the tube is of a dimension maintaining the molten tin by capillarity; the tin does not attach itself to the tube, forming a perfect hydraulic seal.

The chamber 23 has a protective atmosphere which does not act on the glass of the tube. The chamber 28 receives from port 29 and discharges through port 30 a flow of an aerosol obtained by the atomization of liquid tin tetrachloride $SnCl_4$ by means of an inert gas (nitrogen or argon). The glass tube in this chamber will be at about 700° C. and is covered with a layer of tin oxide which is deposited as the tin tetrachloride decomposes on its surface. The coated tube then passes through the upper seal into the chamber 33 through which another aerosol is passed through ports 34, 35. This aerosol is obtained by the atomizing of a solution, containing a mixture of about 10% by volume of chromium chloride and 90% of glacial acetic acid, by nitrogen or argon gas. The temperature of the glass tube in this chamber may be lower than 700° C. but should preferably be above 500° C. In this chamber the glass tube is covered with a layer of chromium oxide which is deposited upon the layer of tin oxide. By varying the thickness of the metal layers the resistivity of the coating may be changed.

The bases of the chambers 28 and 33 contain the heating units 24, 25 which maintain the temperatures necessary for the process.

As one will see immediately, a particular advantage of the invention is that multiple layers of metallic oxide can be applied continuously in a single apparatus and in a single operation, which was previously impossible. The hydraulic joint of this invention permits one to confine the treating gases to their own chambers and to apply them in sequence to the moving rod.

It is possible to do without aerosol in utilizing a gas containing a metal such as carbonyl chromium $Cr(CO)$ or the carbonyl nickel $Ni(CO)_4$. In such case the temperature of the glass is between about 100 and 150° C.

In Examples I and II there has been described the application of the invention to the progressive treatment of the entire surface of a moving article. We now come to a phase of the invention in which the application may be to a part of the article only. In the following example the process is applied for protection or reaction, to one side of a moving sheet of flat glass; a sheet of newly formed glass moves over lands of molten metal which project above the supporting surface, confining the gases which are to be applied to the glass to the space between the lands, the supporting surface, and the surface of the glass.

Example III

The glass is an ordinary window glass having, for example, the following composition:

| | Percent |
|---|---|
| $SiO_2$ | 72 |
| $Al_2O_3$ | 1 |
| $Na_2O$ | 14 |
| CaO | 9 |
| MgO | 4 |

As it is not possible to utilize a gas containing silver, because no volatile component of silver is known, one must utilize an aerosol constituted by the action of an inert gas (nitrogen or argon) on melted silver chloride; the silver chloride has a melting point at about 455° C. and is stable up to 1550° C.

The silver chloride deposited on the sheet is thereafter reduced by means of hydrogen or a mixture of nitrogen and hydrogen containing 4 to 10% of hydrogen acting in the gaseous space between two successive lands of molten metal, tin for example.

Said treatments may be repeated in order to obtain a film of silver of the desired thickness, alternating each deposit of silver with a treatment with, for example, fluorine compounds.

For the deposition of fluorine compounds it is, for example, possible to create an aerosol by the action of an inert gas on melted cryolite or to utilize gaseous compounds of fluorine, for example $SiF_4$ which react with the constituents of the molten glass at temperatures between 700 and 900° C.

The pressures utilized are between a few millimeters and 15 millimeters of water. Higher pressures would raise up the sheet and suppress the effect of the capillary seal.

Figure 4:
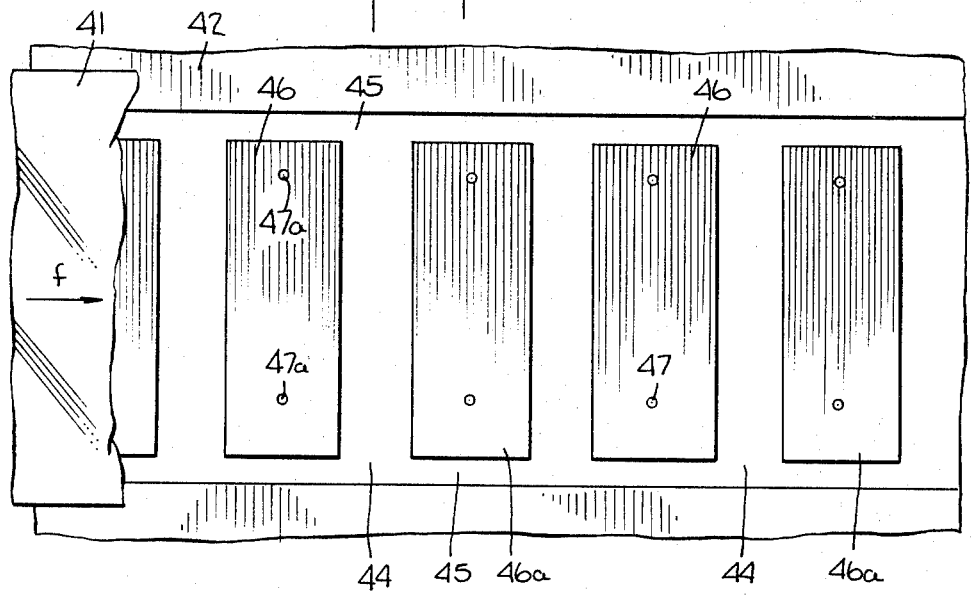

In FIGS. 3 and 4 a sheet of glass 41, moving toward the right as indicated by an arrow, is carried on a graphite support 42, which in this instance is a table. The glass is supported on molten metal lands 43 which project above the top of the table and are retained in channels 44 which are formed in the tops of the table. The sheet of glass is supported, in effect, by the surface tension of the lands of the molten metal. These channels may be of any desired shape. The transverse channels 44 are connected by two longitudinal channels 45 both containing molten metal so that the areas 46—46a between the transverse, successive lands are also closed longitudinally so that its atmosphere is confined without possibility of mixing with the atmospheres of the adjoining areas. In the drawing the channels are shown at 44 and 45, surrounding areas 46 and 46a which are at the level of the bed of the table 42. Ports 47 are supplied with one type of gas from main 48 and ports 50 are supplied with a different gas through main 49. Ports 47a act to carry gas away from the chambers 46, 46a to their respective sources or places of disposal. As a result of this construction, the sheet of glass 41, which is carried on the molten metal lands, may be subjected sequentially to treatments with different gases, each of which is confined rigorously to its own chamber beneath the glass. For example, the chamber 46 may be supplied with an aerosol which will deposit silver at the temperature of the glass while the chamber 46a may be supplied with gaseous fluid capable of depositing a fluoride salt such as cryolite, which has an index of refraction different from that of the glass. The glass thus receives the deposit of a plurality of layers, for instance silver and cryolite, the thickness of which may be rigorously controlled by the duration of each exposure of the sheet to each gas, and by the number of such exposures. In each case, there is taken into consideration the temperature of the glass, the length of the chamber, the speed of the glass, and the concentration of the salt in the gas. An interference filter can be prepared by the process of this example.

In FIGS. 3 and 4 the liquid supports are parallel so that the glass would be subjected to identical treatment on its whole surface, but for many purposes it would be useful to use liquid supports which are not parallel. In such an arrangement the length of contact between the glass and the gas would vary from edge to edge, depending upon the shape of the chambers 46, 46a, and this will produce a variation in the depth of the deposit corresponding to the shape of the chambers. Thus, interference filters can be made which will pass different wave lengths of light which vary regularly from edge to edge. For example, oval chambers would produce a regular variation from the center to the longitudinal edges of the sheet of glass.

Example III refers to the treatment of one side of the glass sheet but it is equally possible to treat the sheet at the same time on its upper surface by using lands of molten metal riding on the surface of the glass beneath a cover in the grooves of which the molten metal is retained.

The liquid employed for the seal shall not wet the glass. It may wet (adhere to) the wall of the aperture, or not. In either case the narrowness between the glass and the wall of the aperture retain the liquid by capillarity. The new joints permit free movement of the article in contact with the liquid without contact with the wall of the aperture. The low friction existing between the glass and the liquid prevents injury to the glass surface.

The value of these devices in obtaining certain desirable results is exemplified by the exclusion of air containing water vapor from glass at temperatures between 800 and 1000° C. at which the surface of newly formed glass is capable of forming large amounts of oxyhydriles, which modify the properties of the glass surface harmfully, producing a reduction of the mechanical characteristics, particularly a reduction of tensile strength.

When one draws glass fibers without special precautions, the constituents of water vapor attach to the surface of the fiber and initiate later chemical reactions, for example, such as would color the glass or make it conductive. In these cases a closed space is established adjacent the drawing zones in which there is maintained a dry atmosphere, or an atmosphere susceptible of entering into controlled reaction with the glass. In the manufacture of filaments the apertures of the chamber through which the filament travels is closed by a liquid which is held by capillarity.

If the temperature at the point of discharge from the chamber does not substantially exceed 300° C., the liquid may advantageously be mercury and the aperture through which the glass passes may be lined with graphite, porcelain or with any other material which is not wet by the mercury.

It is advantageous, when the temperatures employed are higher, to use a molten metal such as tin, or a molten metal alloy, without reaction with the glass.

The gas which is to be confined in the chamber should be inert to the molten metal of the seal and, when the metal is oxidizable, the gas should be neutral and/or reducing. The gas may be, for example, composed of a purified argon free of oxygen and water vapor, of nitrogen, and a mixture of nitrogen and hydrogen.

It is particularly an advantage of the invention that several different gaseous treatments can be applied to the glass in successive steps while maintaining the gases apart from one another. In this way a deposit may take place on the surface of the glass, for instance by absorption or reaction, upon which subsequent and different gases may apply other coats. This method of using the invention can also be used to apply superimposed layers of different materials to a filament or sheet.

Instead of starting a reaction by passing the glass successively into separate chambers containing the reactive elements one may use the liquid which seals the joint and through which the glass passes as one of the reactive elements, either upstream or downstream of the zone containing the gas, suitable replacement of used liquid being provided for.

If the first action of the liquid on the glass is undesirable, its effect may be counteracted by the use of a subsequent treatment which removes the imperfection or annuls the unfavorable reaction. Everything which applies to the manufacture of glass fibers is equally applicable to the manufacture of films, tubes and sheets of glass by continuous methods. For example, in drawing window glass it is possible to establish an atmosphere containing a mixture of $SO_2$ and $SO_3$ in contact with the glass which will react with the alkaline oxides contained in the surface of the glass. That process will, at the moment of cooling, put the surface of the glass in a condition which improves its mechanical strength and chemical durability. The process can also be applied to drawn glass during the drawing, at which time its temperature is such as to make the process particularly efficient.

As many apparently widely different embodiments of the present invention may be made without departing from

What is claimed is:

1. Apparatus for the progressive treatment of a length of material which comprises a chamber, means to introduce the material to the chamber and means to withdraw the material from the chamber comprising an aperture in the chamber which is larger than the material by a capillary amount and which is filled with a non-adherent liquid, means to flow a treating fluid through the chamber in contact with the material, and pressure controlling means for the chamber.

2. Apparatus for the treatment of a moving length of material comprising a treating chamber, conduit means to introduce a treating fluid to the chamber and to remove it therefrom, aperture means in the chamber, for the passage of the length of material, having dimensions which form with the material a capillary aperture, and sealing means in the aperture means being a metallic liquid which is non-adherent to the material and to the substance of which the wall of the aperture is composed and which is retained by capillarity between wall and material.

3. Apparatus for the treatment of a moving length of material which comprises a plurality of conjoined chambers, aperture means in the chambers for the passage of the material, means to apply different treating fluids in the different chambers, and sealing means for the apertures comprising a metallic liquid which is non-adherent to the substances which bound the aperture.

4. Apparatus for fibering glass comprising a crucible for molten glass having a drawing nozzle, means to draw glass fibers therethrough, a chamber extending from the drawing nozzle about the drawn fiber, means to fill the chamber with a fluid for treating the glass fiber, and means to withdraw the fiber from the chamber comprising aperture means in the chamber which is of dimensions capable of holding by capillarity a liquid in the aperture, and a non-adherent liquid in the aperture means.

5. Apparatus of claim 1 in which the pressure controlling means comprises a valve, and a manometer marked with the limits of pressure tolerable by the liquid seal.

6. A method of coating glass progressively with layers of metal oxide which comprises passing the glass through an atmosphere providing one metal oxide, into contact with a liquid seal, and through an atmosphere providing another metal oxide, at temperatures in each instance, effective to deposit the particular oxide.

7. Apparatus according to claim 3 in which the sealing material is mercury.

8. Apparatus according to claim 3 in which the sealing material is molten metal.

9. Apparatus for the treatment of a moving length of glass which comprises a plurality of conjoining chambers, barrier means delimiting the chambers and providing for the passage of the material, and means to flow different treating fluids into the chambers, the barrier means for the chambers comprising a liquid seal in contact with the material.

10. Apparatus according to claim 9 in which the chambers of uneven order are filled with an atmosphere different from the atmosphere of the chambers of even order, said atmospheres being capable of forming films on the sheet material, said sheet being thus submitted to sequential treatments capable of providing it with superposed films.

11. Apparatus according to claim 10 in which the films are metallic.

12. Apparatus for drawing glass tubing, comprising, a draw bar, a series of chambers above said draw bar, said chambers being interconnected with each other by apertures for the passage of the tube drawn through said draw bar, non-adherent liquid sealing means for each said aperture, means to introduce one treating fluid into one said chamber, and means to introduce another treating fluid into another said chamber.

References Cited

UNITED STATES PATENTS

| | | | |
|---|---|---|---|
| 2,215,449 | 9/1940 | Alexander et al. | 34—242 |
| 2,860,450 | 11/1958 | Case | 65—3 |
| 2,893,895 | 7/1959 | Claussen | 65—3 |
| 3,226,203 | 12/1965 | Rummel | 34—242 |
| 3,193,365 | 7/1965 | Pulmat | 65—65 |
| 3,250,604 | 5/1966 | Toytat et al. | 65—182 XR |

DONALL H. SYLVESTER, *Primary Examiner.*

R. L. LINDSAY, *Assistant Examiner.*